Aug. 22, 1939.      R. RICHTER      2,170,428
FOUR-LENS PHOTO-OBJECTIVE
Filed May 24, 1938
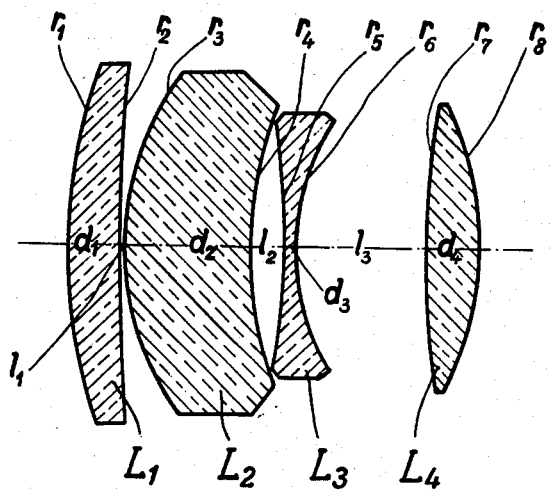
| | | | $n_d$ | $\nu$ |
|---|---|---|---|---|
| $r_1 = +\ 85.4$ | $d_1 =$ | 7.7 | 1.6138 | 56.3 |
| $r_2 = -\ 500$ | $l_1 =$ | 0.5 | | |
| $r_3 = +\ 44.5$ | $d_2 =$ | 19.0 | 1.6138 | 56.3 |
| $r_4 = +\ 70.0$ | $l_2 =$ | 4.5 | | |
| $r_5 = -\ 135$ | $d_3 =$ | 2.0 | 1.7174 | 29.5 |
| $r_6 = +\ 34.3$ | $l_3 =$ | 19.0 | | |
| $r_7 = +\ 146$ | $d_4 =$ | 8.0 | 1.6138 | 56.3 |
| $r_8 = -\ 46.8$ | | | | |
Inventor:
Robert Richter Patented Aug. 22, 1939

2,170,428

UNITED STATES PATENT OFFICE 2,170,428

FOUR-LENS PHOTO-OBJECTIVE

Robert Richter, Jena, Germany, assignor to the firm of Carl Zeiss, Jena, Germany Application May 24, 1938, Serial No. 209,640
In Germany May 31, 1937

1 Claim. (Cl. 88—57)

An application has been filed in Germany May 31, 1937.

The present invention refers to photographic and projection objectives consisting of four single lenses which are axially spaced by air and the third lens of which is dispersive while the three other lenses are convergent. The lenses and refractive surfaces are designated according to their sequence in photographing, the first lens being the lens, and the front surface of a lens being the surface, next to the object to be photographed. In projection, the first lens and the front surface of a lens are, accordingly, next to the projection screen. Objectives of this kind have often been suggested with a view to obtaining wide apertures. The invention aims especially at improving such objectives of the said kind in which the front surfaces of the first and the second lens and the rear surface of the fourth lens are convex, in which each of these surfaces is curved more strongly than the other surface of the same lens, in which the rear surface of the third lens is more strongly curved than the front surface of this lens, and in which the axial distance apart of the third and the fourth lens is greater than the axial distance apart of the third and the second lens. It has been attempted to improve these objectives with respect to image quality by making use of strongly curved cemented surfaces, without which the objectives are by far not so good.

A good objective of wide aperture can be obtained, however, also without recourse being had to cemented surfaces by providing that the front surface of the first lens has a radius of curvature greater than 55% of the focal length of the objective, that the axial thickness of the second lens is greater than 12% of the focal length of the objective, that the third lens is of glass having a refractive index $n_d$ greater than 1.66 and an Abbe number $\nu$ smaller than 33.0, and that the radius of curvature of the rear surface of the second lens is no greater than the focal length of the objective. While being very simple in construction, this objective offers nevertheless a very good image defination having an angular field of up to approximately 40°.

The accompanying drawing, which illustrates the invention, shows by way of example a projection objective that consists of lenses $L_1$, $L_2$, $L_3$ and $L_4$ axially spaced by air and whose lens $L_3$ is dispersive while its lenses $L_1$, $L_2$ and $L_4$ are convergent. This objective has a maximum relative aperture of 1:1.9.

The magnitudes stated in the following table as the radii, thicknesses and axial distances of the lenses refer to a focal length of the objective of 100 mm.

| Radii | Thicknesses and distances | Kinds of glass | |
|---|---|---|---|
| | | $n_d$ | $\nu$ |
| $r_1 = + 85.4$ | $d_1 = 7.7$ | 1.6138 | 56.3 |
| $r_2 = -500$ | | | |
| $r_3 = + 44.5$ | $l_1 = 0.5$ | | |
| $r_4 = + 70.0$ | $d_2 = 19.0$ | 1.6138 | 56.3 |
| | $l_2 = 4.5$ | | |
| $r_5 = -135$ | $d_3 = 2.0$ | 1.7174 | 29.5 |
| $r_6 = + 34.3$ | | | |
| $r_7 = +146$ | $l_3 = 19.0$ | | |
| $r_8 = - 46.8$ | $d_4 = 8.0$ | 1.6138 | 56.3 |

I claim:

In a photographic objective comprising four single lenses in axial alignment and spaced by air, the third lens being dispersive and the other lenses convergent, the front surfaces of the first and the second lens and the rear surface of the fourth lens being convex and having radii of curvature numerically smaller than the focal length of the objective, the front surface of the first lens having a radius of curvature greater than 55% of the focal length of the objective, and the rear surface of the second lens being concave and having a radius of curvature corresponding to at most the focal length of the objective, the rear surface of the third lens being concave and having a radius of curvature numerically smaller than that of the front surface of this lens and greater than 25% of the focal length of the objective, the axial distance apart of the third and the fourth lens being greater than the axial distance apart of the third and the second lens and smaller than 30% of the focal length of the objective, the axial thickness of the second lens being greater than 12% and smaller than 30% of the focal length of the objective, and the third lens being of glass of a refractive index $n_d$ greater than 1.66 and smaller than 1.89 and having an Abbe number $\nu$ smaller than 33.0 and greater than 23.0.

ROBERT RICHTER.